Oct. 26, 1954 T. P. BELL 2,692,542
DEPTH CONTROL MECHANISM FOR GROUND TILLING IMPLEMENTS
Filed May 8, 1951 2 Sheets-Sheet 2
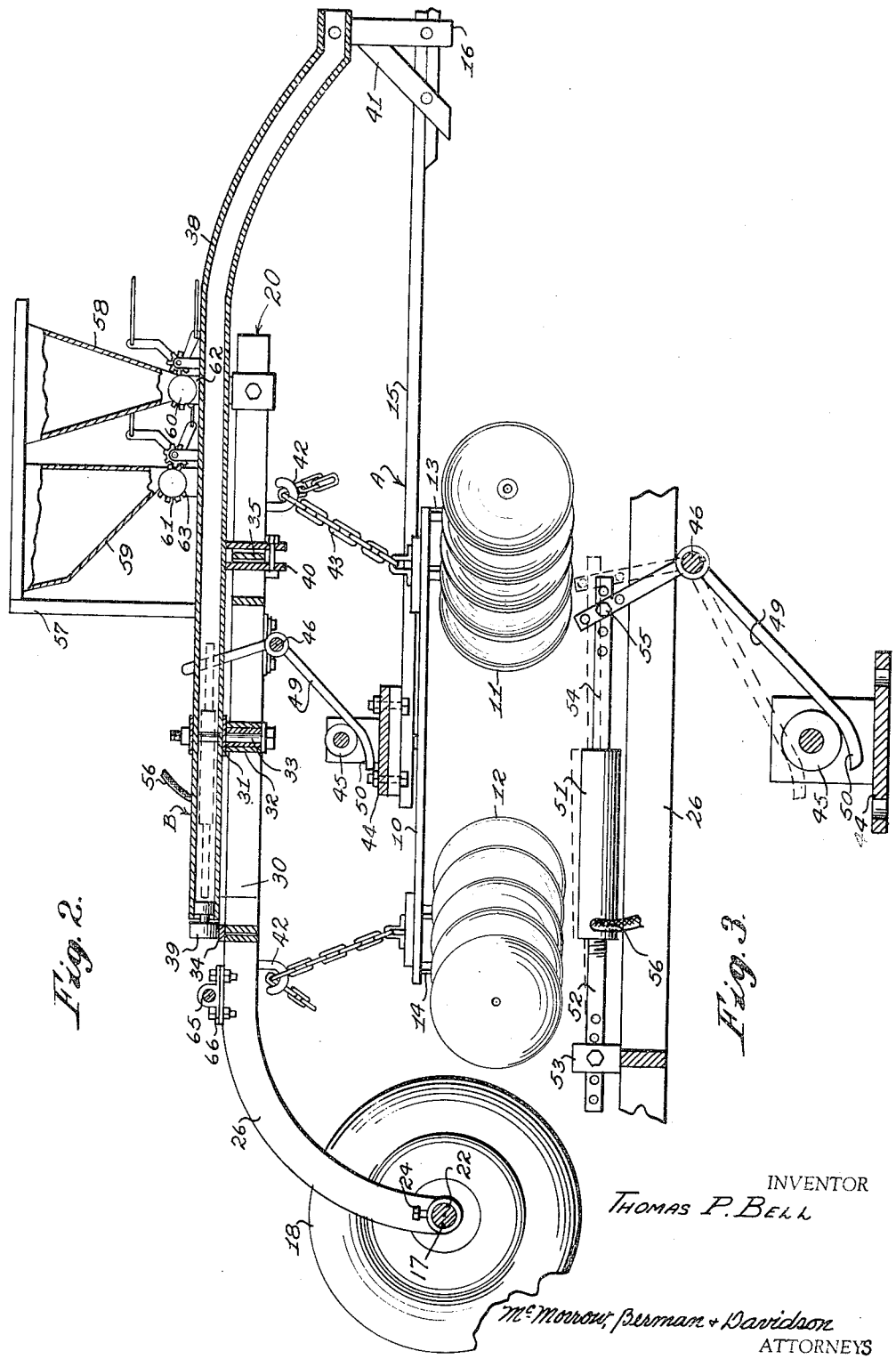
INVENTOR
THOMAS P. BELL
McMorrow, Berman + Davidson
ATTORNEYS Patented Oct. 26, 1954

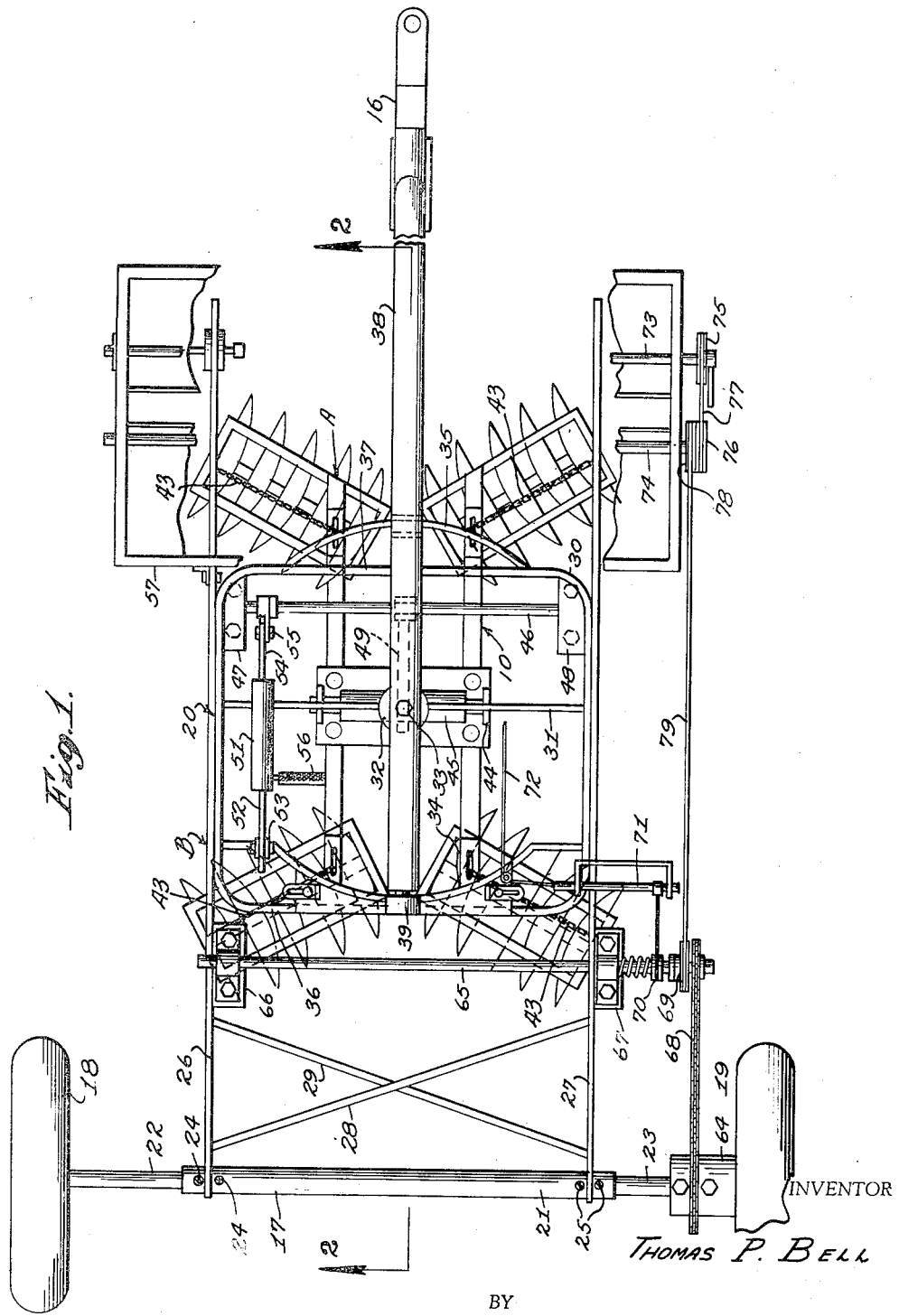

2,692,542

UNITED STATES PATENT OFFICE 2,692,542

DEPTH CONTROL MECHANISM FOR GROUND TILLING IMPLEMENTS

Thomas Polk Bell, El Dorado, Ark.

Application May 8, 1951, Serial No. 225,220

3 Claims. (Cl. 97—46.27)

1

This invention relates to depth control mechanisms for ground tilling implements, and more particularly to a device for controlling the operating depth of a disc harrow or plow.

It is among the objects of the invention to provide an improved device for controlling the operating depth of a disced tilling implement which device has ground engaging wheels disposed at the rear of the implement and is supported at its front end on an implement towing tractor and supports the implement for operation at a uniform predetermined depth in the ground; which has power operated means for lifting the implement for turning and will turn with the implement and tractor; which assists in aligning the implement with the direction of movement of the implement for operation; which will support the implement in an elevated position for transportation so that the implement and depth controlling device can be moved over a paved road, if desired; and which is simple and durable in construction, economical to manufacture and positive and effective in operation.

Other objects and advantages will become apparent from a consideration of the following description and the appended claims in conjunction with the accompanying drawings wherein:

Figure 1 is a top plan view of a ground tilling implement and depth controlling device therefor in accordance with the present invention;

Figure 2 is a longitudinal cross sectional view on the line 2—2 of Figure 1; and Figure 3 is a fragmentary view similar to Figure 2, but on an enlarged scale showing structural details of the device.

With continued reference to the drawings, the device includes a disc harrow of known construction, generally indicated at A and a supporting device for the harrow, generally indicated at B.

The harrow A has a frame 10 of elongated, generally rectangular shape and has a front set of discs 11 and a rear set of discs 12 spaced from the front set. Each set of discs includes a pair of disc structures disposed in end to end relationship with the discs of each structure mounted on a common axle and these structures are secured to the frame by suitable means, such as the standards 13 and 14.

The discs are disposed below the frame 10 and a tongue 15 is disposed above the frame and rigidly connected to the frame. This tongue extends forwardly from the frame and is provided at its front end with a hitch formation 16 for connecting the disc harrow to a towing tractor.

The depth controlling device B comprises an axle 17 disposed to the rear of the disc harrow A, rubber tired wheels 18 and 19 journaled on the axle 17, one at each end of the axle, and a frame 20 extending upwardly and forwardly from the axle 17 with its major portion disposed above the disc harrow frame 10.

The axle 17 comprises a tubular intermediate member 21 and end members 22 and 23 in the form of rods or stub shafts slidably received in the intermediate member, one at each end of the latter, and secured in positions of longitudinal adjustment relative to the intermediate member by suitable means, such as the set screws 24 and 25, so that the distance between the wheels 18 and 19 can be varied.

The frame 20 comprises a pair of side members 26 and 27 disposed in spaced apart and substantially parallel relationship to each other. These side members are secured at their rear ends to the intermediate member 21 of the axle near the respectively opposite ends of this intermediate member and are curved upwardly and forwardly from the axle to a location intermediate their length. The forward portions of these side members are straight and extend above and one along each side of the implement frame and forwardly of the latter.

A pair of cross braces 28 and 29 extend between the side members 26 and 27 adjacent the axle 17 and a rectangular structure 30 is disposed between and connected to the side members 26 and 27 directly above the implement frame 10.

A bar 31 extends transversely of the rectangular structure 30 intermediate the length of the latter and substantially perpendicular to the frame side members 26 and 27 and a pivot hub 32 is carried by this bar substantially at its mid-length location. A pivot pin 33 is mounted in the hub 32 and is disposed substantially perpendicular to the frame 20 and is substantially vertical when the frame is in operative position.

Partly circular trackways 34 and 35 are carried by the rectangular structure 30 substantially concentric with the axis of the pivot pin 33. The rear trackway 34 is disposed within the rectangular structure adjacent the rear end member 36 of this structure, and the trackway 35 is disposed immediately ahead of the front end member 37 of the rectangular structure.

A tubular beam 38 is connected at a location intermediate its length to the pivot pin 33 and has at its rear end a roller 39 journaled in the beam by suitable antifriction bearings and bearing on the rear trackway 34. A bracket 40 depends from the beam 38 and surrounds the front trackway 35. This front trackway extends through a restricted arc and is effective to limit swinging movements of the beam 38 relative to the frame 20 about the axis of the pivot pin 33.

At its front end the beam 38 is curved forwardly and downwardly and a bracket 41 is rigidly secured to the harrow tongue 15 adjacent the hitch formation 16 and is connected to the front end of the beam 38.

The bracket 41 maintains the beam 38 substantially in longitudinal alignment with the harrow tongue 15 so that the wheels 18 and 19 of the depth control mechanism will be constrained to track behind an implement towing tractor, the trackway 35 permitting limited incidental swinging movements of the harrow support B relative to the draft line of the towing tractor, the support B being centered by the pull of the beam 38 on the pivot pin 33 which is disposed ahead of the rear axle 17. The resistance of the harrow A to lateral movement and the chain connections between the harrow and the support frame also tend to maintain the support wheels 18 and 19 in trailing relationship to the towing tractor.

Hooks, as indicated at 42, are secured to the side members 26 and 27 of the frame 20, two on the straight portion of each of said side members and depend therefrom, and flexible means, such as the chains 43 are connected one between each of these hooks and the adjacent corner of the harrow frame 10 to support the harrow at a predetermined distance below the frame of the depth control mechanism. The chains can be adjustably connected to the corresponding hooks so that the distance at which the harrow is supported below the frame 20 can be adjustably varied to control the depth of the harrow discs in the soil.

A bracket 44 is mounted on the tractor tongue 15 near the rear end of the tongue and carries a roller 45 which is spaced above the tongue 15 and extends transversely thereof.

A shaft 46 extends transversely of the rectangular frame 30 near the front end thereof and is disposed below the frame 20 and journaled at its ends in bearings 47 and 48 carried by the rectangular structure 31 at each front corner thereof.

A lever 49 is mounted intermediate its ends on the shaft 46 substantially at the mid-length location of the shaft and has one arm disposed beneath the roller 45, this arm of the lever 49 being longitudinally curved, as is particularly illustrated in Figures 2 and 3 at 50. The other arm of the lever 49 projects upwardly from the shaft 46 near one side of the frame 20 and is connected at a location spaced from the shaft 46 to a hydraulic mechanism. This hydraulic mechanism comprises a cylinder 51 adjustably connected at one end to the rectangular structure 30 by a rod 52 having a screw thread connection at one end with the hydraulic cylinder and having its other end secured to a bracket 53 carried by the structure 30 near the rear end of the latter. A piston rod 54 projects out of the cylinder 52 and is pivotally connected at its outer end to the upper arm of the lever 49, as indicated at 55.

A hydraulic conduit 56 is connected to the cylinder 51 near the end of the cylinder remote from the piston rod 54 for applying hydraulic fluid under pressure to the interior of the cylinder from the tractor hydraulic system to move the lever 49 to raise the harrow A relative to the frame of the depth control mechanism B. The harrow will be lowered by its own weight when the hydraulic fluid under pressure is released from the cylinder 51.

With this mechanism the harrow can be hydraulically raised relative to the frame of the depth control mechanism and can be secured at any desired elevation relative to the frame of the depth control mechanism by connecting properly selected links of the chains 43 with the associated hooks 42.

If it is desired to use the disc harrow and depth control mechanism combination as a fertilizer spreader or grain drill, suitable boxes or hoppers for fertilizers and seed grain may be mounted on the mechanism frame 20 and one of the wheels of the mechanism may be drivingly connected to these boxes to distribute the fertilizer and grain during the operation of the device.

In the arrangement illustrated a subframe 57 is mounted on the portions of the side members 26 and 27 of the frame 20 projecting forwardly of the rectangular structure 30 and extends above the beam 38. A seed box 58 and a fertilizer box 59 of known construction are mounted in the subframe 57 and dispensing devices 60 and 61 are disposed immediately below these boxes and are connected with the interiors of the boxes for dispensing the seed and fertilizer therefrom. Suitable means of known construction, as indicated at 62 and 63, are associated with the dispensing mechanisms to close the dispensing openings at the bottoms of the seed and fertilizer boxes to discontinue the dispensing operation, when desired, these control mechanisms being operated by the operator of the controlling tractor.

In order to drive the dispensing devices for the boxes 58 and 59, one of the wheels of the depth controlling device, for example the wheel 19, is provided with an elongated hub 64 carrying a chain sprocket. A shaft 65 extends transversely of the frame 20 at a location near the rear end of the rectangular structure 30 and is journaled in bearings 66 and 67 carried by the frame members 26 and 27 respectively. A chain sprocket is provided on the shaft 65 near the end of this shaft adjacent the wheel 19 and a chain 68 drivingly connects the sprocket on the wheel hub 64 with the sprocket on the shaft 65 to drive the shaft 65 when the wheel 19 rotates. A chain sprocket 69 is journaled on the shaft 65 and a manually operated clutch 70 is mounted on the shaft for drivingly connecting the shaft to this sprocket 69. A clutch releasing device 71 is mounted on the frame side member 27 immediately ahead of the shaft 65 and a flexible strand 72 extends from this clutch releasing mechanism to a location adjacent the seat of a towing tractor, so that the clutch can be released by the tractor operator, when desired.

Shafts 73 and 74 project from the dispensing mechanisms 60 and 61 respectively, and carry chain sprockets 75 and 76 which are interconnected by a chain 77. A second chain sprocket 78 is mounted on the shaft 74 which is nearest the axle 17 and a chain 79 connects the sprocket 69 on the shaft 65 with the sprocket 78 so that the shafts 73 and 74 will be driven when the clutch 70 is engaged as the wheel 19 is rotated.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. A ground tilling implement comprising a disc harrow including a frame, ground tilling discs carried by said frame and disposed therebelow, and a tongue connected to and projecting from said frame and having a hitch formation on its distal end, an axle disposed at the rear of said harrow, ground engaging wheels journaled on said axle one at each end of the latter, a second frame secured at one end to said axle and extending upwardly and forwardly from said axle with its major portion disposed above the harrow frame, said second frame including means providing a central pivot and partly circular trackways concentric with said pivot and disposed above said harrow frame one to the rear of and one in front of said pivot, a beam disposed above said second frame and connected intermediate its length to said pivot, a roller carried by said beam at one end thereof and riding on one of said trackways at the rear of said pivot, means pivotally connecting said beam at its other end to said tongue adjacent said hitch formation, means connected between said beam and one of said trackways at the front of said pivot limiting swinging movement of said beam relative to said second frame about the axis of said pivot, power operated means connected between said second frame and said harrow frame below said pivot for raising said harrow, and flexible means connected between said harrow frame and said second frame supporting said harrow at selected distances below said second frame to regulate the operating depth of said discs in the ground.

2. Depth controlling mechanism for a ground tilling implement comprising a wheel supported axle, a frame connected at one end to said axle and adapted to be disposed above a tilling implement, a beam pivoted intermediate its ends on said frame for swinging movement about a vertical axis, said beam having a forward end projecting forwardly from said frame, means on said forward end of the beam for connecting said beam to a tongue on the tilling implement, power operated means on said frame having a lever arm depending from said frame for operative engagement with a tilling implement for raising the implement relative to the frame, and means for flexibly suspending the implement from said frame.

3. Depth controlling mechanism for a ground tilling implement comprising a wheel supported axle, a frame connected at one end to said axle and adapted to be disposed above a tilling implement, a beam mounted on said frame, said beam having a forward end projecting forwardly beyond said frame, means on said forward end of the beam for connecting the beam to an implement tongue, means on said frame for flexibly suspending an implement beneath said frame, and power operated means on said frame comprising a bracket adapted to be connected to an implement, a roller journaled on said bracket, a lever pivotally mounted intermediate its ends on said frame for movement on an axis extending transversely of said frame and having one arm engaged with said roller, and hydraulic mechanism operatively connected between said frame and the other arm of said lever for moving said lever.

References Cited in the file of this patent

UNITED STATES PATENTS

| Number | Name | Date |
|---|---|---|
| Re. 12,690 | Hazard | Sept. 3, 1907 |
| 379,003 | Coffman | Mar. 6, 1888 |
| 456,261 | Wash | July 21, 1891 |
| 574,102 | Miller | Dec. 29, 1896 |
| 630,300 | Moore | Aug. 1, 1899 |
| 1,301,268 | Jarriel | Apr. 22, 1919 |
| 1,334,559 | Schaumburg | Mar. 23, 1920 |
| 1,931,815 | Conley | Oct. 24, 1933 |